(12) United States Patent
Hirano et al.

(10) Patent No.: US 6,874,671 B2
(45) Date of Patent: Apr. 5, 2005

(54) SOLDERING TOOL

(75) Inventors: Tsumoru Hirano, Saitama (JP); Masaru Nakamura, Saitama (JP)

(73) Assignee: Nakajima Copper Works, Inc., Saitama (JP)

( * ) Notice: Subject to any disclaimer, the term of this patent is extended or adjusted under 35 U.S.C. 154(b) by 0 days.

(21) Appl. No.: 10/369,139

(22) Filed: Feb. 20, 2003

(65) Prior Publication Data

US 2003/0168493 A1 Sep. 11, 2003

(30) Foreign Application Priority Data

Mar. 6, 2002  (JP) ........................................ 2002-059687

(51) Int. Cl.[7] .............................. B23K 3/02; B23K 3/04
(52) U.S. Cl. ............................ 228/51; 228/53; 126/414
(58) Field of Search ............................. 228/51, 52, 53; 431/128, 6, 75, 7, 153; 126/236, 413, 414

(56) References Cited

U.S. PATENT DOCUMENTS

| | | | |
|---|---|---|---|
| 4,726,767 A | | 2/1988 | Nakajima |
| 4,785,793 A | * | 11/1988 | Oglesby et al. ............. 126/414 |
| 4,920,952 A | | 5/1990 | Nakajima |
| 5,178,530 A | * | 1/1993 | Roldan et al. ................ 431/75 |
| 5,215,456 A | * | 6/1993 | Fujiwara ......................... 431/7 |
| 5,771,881 A | * | 6/1998 | Oglesby et al. ............. 126/414 |
| 5,921,231 A | * | 7/1999 | Butler ........................ 126/414 |
| 6,244,853 B1 | * | 6/2001 | Oglesby et al. ................ 431/6 |
| 6,296,475 B1 | * | 10/2001 | Tsai ........................... 431/153 |

FOREIGN PATENT DOCUMENTS

JP   2002-144027 A  *  5/2002

* cited by examiner

*Primary Examiner*—Lynne R. Edmondson
(74) *Attorney, Agent, or Firm*—Liniak, Berenato & White (57) ABSTRACT

A soldering iron capable of eliminating static charges accumulated on an operator or materials to be soldered simply without using no particular charge elimination device, the soldering iron comprising a combustion catalyst for complete combustion of a gas mixture of a fuel gas and air, a soldering iron tip heated by the combustion catalyst, a gas conduit for exhausting a combustion exhaust gas from the combustion catalyst along the outer circumference of the soldering iron tip toward the top end, and an electric conduction mechanism for electrically connecting an operator for conducting soldering and the soldering iron tip, fuel gas combustion products which are ionized and forming steams upon catalytic combustion contributing to charge elimination.

9 Claims, 8 Drawing Sheets

SOLDERING TOOL

BACKGROUND OF THE INVENTION

1. Field of the Invention

The present invention concerns a soldering iron using a liquefied gas such as a butane gas or propane gas as a fuel gas and, more in particular, it relates to a soldering iron capable of eliminating electrostatic charges accumulated on an operator or materials to be applied with soldering.

2. Statement of the Related Art

Soldering tools or soldering irons using liquefied gas such as a butane gas and a propane gas as the fuel gas have generally been known. The soldering gas irons have advantages in that they are simple and convenient and easy to use since they require no external power supply and have no electric cords, as well as have no worry of troubles caused by electric leak current since electric heaters are not used as a heat source like electric irons and thus they are suitable to soldering operation for electronic circuits and the likes.

However, the soldering iron using the liquefied gas involves a problem caused by static electricity charged on an operator or materials to be soldered. Such static charges may often damage electronic parts to be soldered.

In addition, the gas iron also has the following problem. In recent years, circuit substrates or electronic parts to be soldered have been decreased in the size more and more and the size of the soldering iron tip has also to be decreased correspondingly. However, when the size of the soldering iron is decreased, the size of the soldering iron tip has also to be decreased inevitably to result in insufficiency of heat capacity, which worsens the efficiency of the soldering operation. Particularly, in a case of using Pb-free solder, since a larger heat capacity is required for the soldering chip, this causes a more significant problem.

Further, since the soldering iron tip is exposed to a high temperature, the surface is violently oxidized to greatly shorten the working life of the tip.

The present invention has been accomplished in view of the foregoing situations and intends to provide a soldering iron capable of eliminating electrostatic charges accumulated on an operator or materials to be soldered, thereby preventing damages to electronic parts and the likes caused by static electricity, as well as capable of improving the efficiency of the soldering operation even when the size of the soldering chip is decreased and capable of preventing oxidation of the soldering iron tip thereby extending the working life thereof.

Further, the invention intends to provide a soldering iron capable of transferring energy of heat generated from a combustion catalyst efficiently to a soldering iron tip.

Further, the invention intends to provide a soldering iron capable of exchanging the soldering iron tip when consumed easily and inexpensively.

Further, the invention intends to provide a soldering iron capable of easily conducting circumferential positioning between the iron tip member and a base part when the latter part is made exchangeable.

Further, this invention intends to provide a soldering iron capable of easily conducting circumferential positioning between the iron tip member and a base part when the latter part is made exchangeable and capable of suppressing lowering of temperature at the iron tip member.

Further, the invention intends to provide a soldering iron capable of easily attaching a sensor and accurately detecting the temperature at the iron tip member.

Further, the invention intends to provide a soldering iron capable of always confirming the temperature at the iron tip member during soldering operation.

Further, the invention intends to provide a soldering iron which enables an operator to conduct soldering operation and perform charge elimination quite unconsciously by merely conducting usual soldering operation.

Further, the invention intends to provide a soldering iron capable of constituting a conductive grip part with a member separate from a grip for soldering iron and capable of constituting the conductive grip part by the soldering grip itself.

SUMMARY OF THE INVENTION

In accordance with the present invention, a soldering iron comprises a combustion catalyst for complete combustion of a gas mixture of a fuel gas and air, a soldering iron tip heated by the combustion catalyst, a gas conduit for exhausting a combustion exhaust gas from the combustion catalyst along the outer circumference of the soldering iron tip toward the top end, and an electric conduction mechanism for electrically connecting an operator for conducting soldering and the soldering iron tip.

In this feature of the invention static charges accumulated on materials to be soldered, as well as static charges accumulated on the operator can be eliminated due to the charge elimination effect obtained from the combustion catalyst and the combustion exhaust gas, by connecting the operator and the soldering iron tip electrically by way of the electroconduction mechanism. Further, since the periphery for the area to be soldered is heated preliminarily by the heat of the combustion exhaust gas, even when the size of the soldering iron tip is decreased, insufficiency of the heat capacity of the tip can be compensated by the combustion exhaust gas. Further, since the periphery of the soldering iron tip is surrounded with the inert combustion exhaust gas, the soldering iron tip can be prevented from oxidation to enhance the working life.

In the soldering iron of the invention, the soldering iron tip, preferably, comprises a flange situated at a longitudinal intermediate position, a iron tip member situated to the top end of the flange and a heat collector situated to the base end of the flange, in which the combustion catalyst is disposed to the heat collector and the flange has gas exhaustion portions for exhausting the combustion exhaust gas toward the iron tip member.

With the constitution described above, the energy of heat generated from the combustion catalyst can be transferred efficiently to the soldering iron tip.

In the embodiment described above, the soldering iron tip comprises a base part having a base end flange constituting a portion of the flange and the heat collector and a top part having a top end flange constituting the remaining portion of the flange and a iron tip member in which the top part is made exchangeable.

In this invention, the iron tip member can be exchanged easily and inexpensively when the member is exhausted.

In this case, the gas conduit is disposed to the outer circumference of the flange, and the base part and the top part are circumferentially positioned by the gas conduit.

This can facilitate circumferential positioning between the exchangeable top part and the base part.

Further, the base part and the top part have concave and convex portions engaging to each other on the contact surfaces thereof and the base part and the top part are circumferentially positioned by the engagement between the concave and convex portions.

Then, even in a case where the top part of the soldering iron tip is made into an exchangeable structure, it can be easily positioned circumferentially with the base part and lowering the temperature at the iron tip member can be decreased extremely.

In each of the embodiments described above, the heat collector has a sensor at the base end thereof for detecting the temperature at the iron tip member.

This can facilitate attachment of the sensor and enables accurate detection of the temperature at the iron tip member.

In this case, the sensor is connected with a temperature indicator provided to a grip for soldering iron.

This enables to always confirm the temperature at the iron tip member upon soldering operation to greatly reduce the occurrence of failed products.

In each of the embodiments described above, the electro-conduction mechanism comprises a conductive grip part disposed to the grip for soldering iron and an intermediate conductive portion connecting the conductive grip part with the iron tip member.

Then, an operator who conducts soldering operation can eliminate static charges quire unconsciously by merely holding the grip, during usual soldering operation for charge elimination, and this does not increase operator's burden at all.

In a modified embodiment, the conductive grip part is formed of an electroconductive member situated on the surface of the grip for soldering iron. This enables to constitute the conductive grip part by a separate member from the grip for soldering iron, or constitute by the grip for soldering iron per se.

DESCRIPTION OF THE ACCOMPANYING DRAWINGS

Preferred embodiments of the present invention will be described in details based on the drawings, wherein.

DESCRIPTION OF THE PREFERRED EMBODIMENTS

The present invention is to be described with reference to the drawings.

Figure 1:
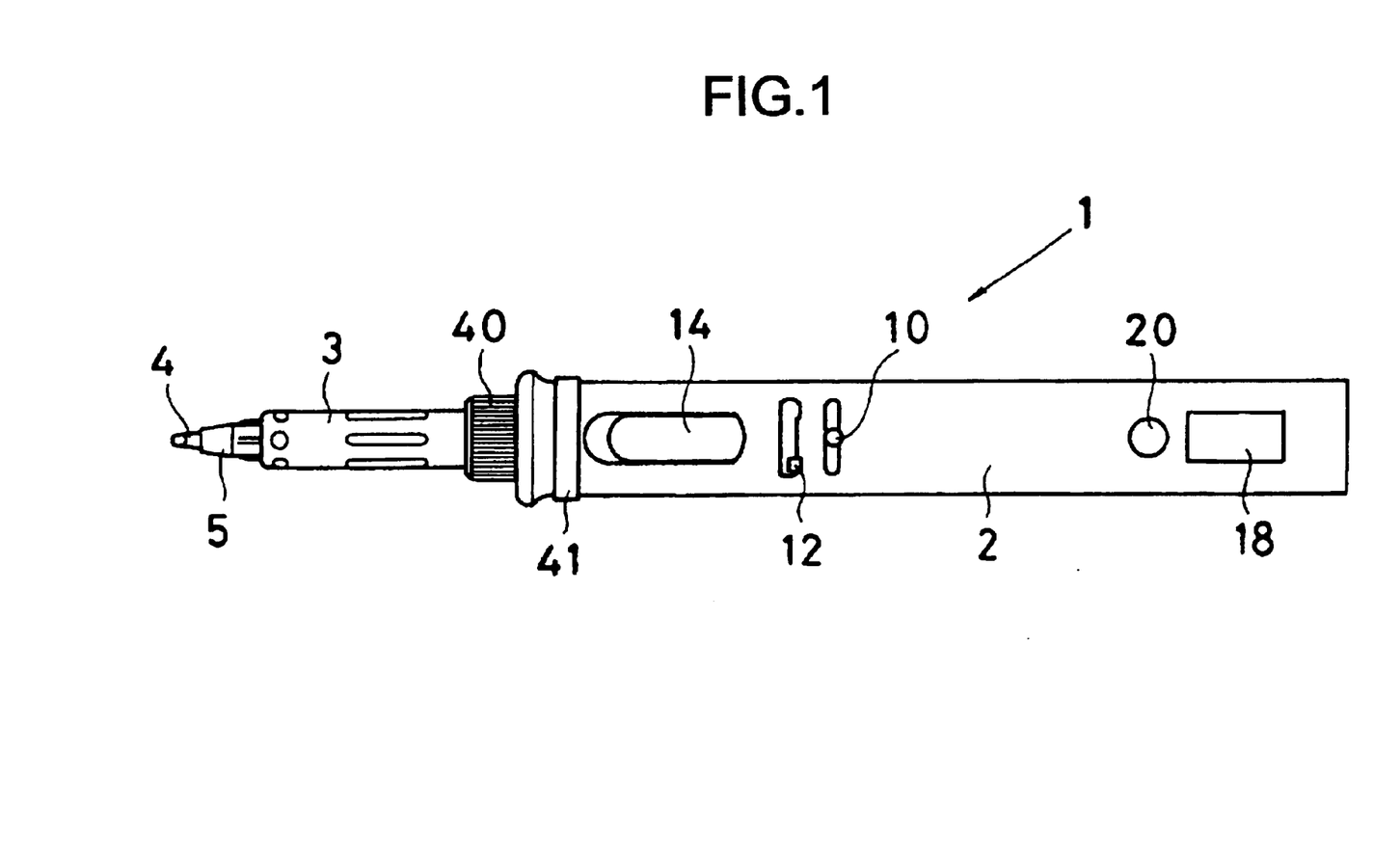
FIG. 1 is a plan view illustrating a soldering iron according to a first embodiment of the invention.
Figure 2:
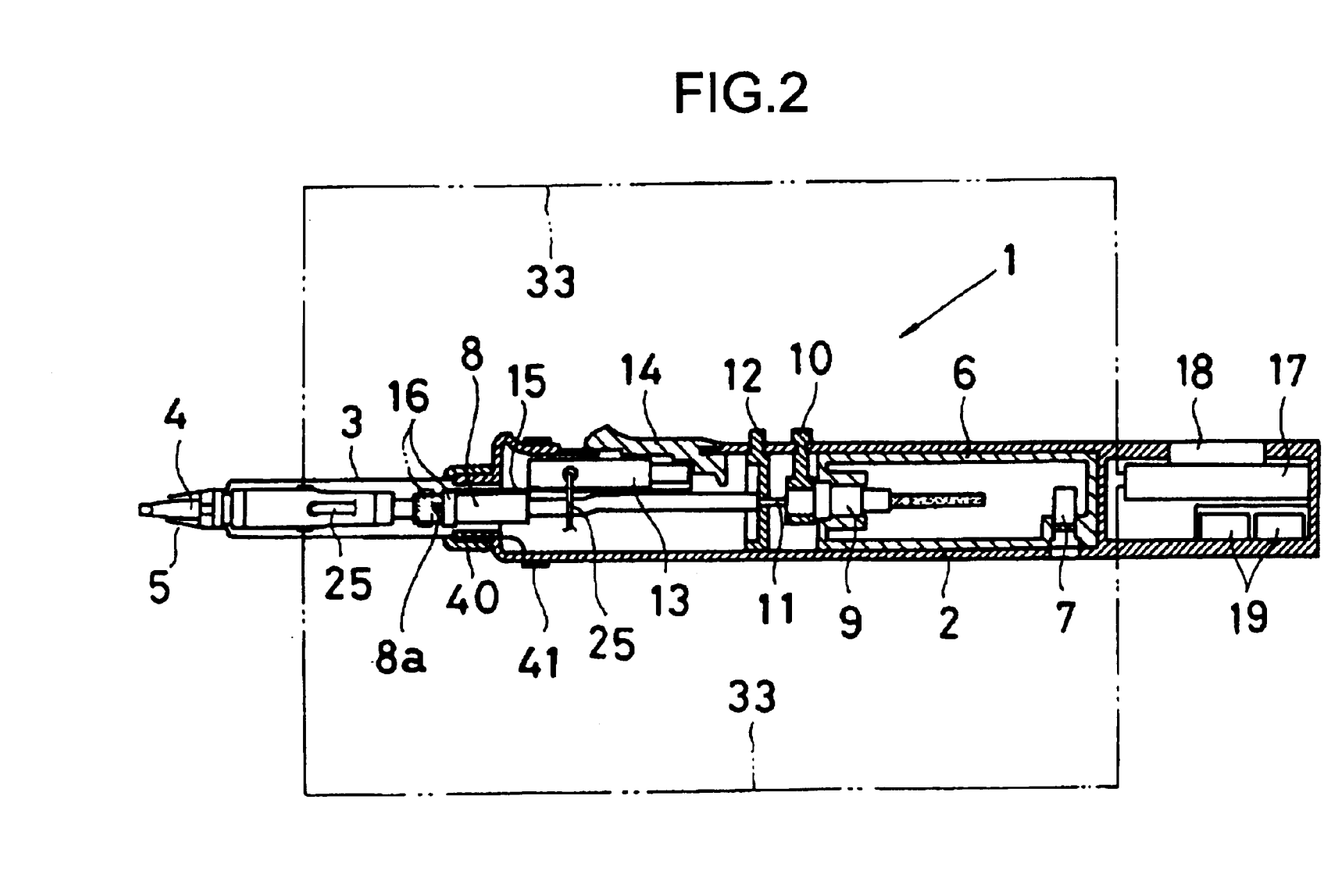
FIG. 2 is a cross sectional view of the soldering iron shown in FIG. 1.

FIG. 1 and FIG. 2 show a soldering iron according to a first embodiment of the present invention. A soldering iron 1 has a grip 2 for soldering iron in a shape, for example, of a longitudinal cylinder. A soldering iron tip 4 and a gas conduit 5 to be described later are provided on the top end of the grip 2.

As shown in FIG. 2, the grip 2 is incorporated with a gas reservoir 6 to which a liquefied gas such a as butane gas is injected from an injection valve 7 and also incorporated with a gas mixture generator 8 for mixing the liquefied gas from the gas reservoir 6 and air to generate a gas mixture, with the top end of the generator being protruded from the grip 2.

Further, as shown in FIG. 2, the grip 2 has a flow control valve 9 disposed inside thereof for controlling the flow rate of the liquefied gas from the gas reservoir 6, and a control lever 10 of the valve protrudes outward of the grip 2. The flow control valve 9 also has a function as an ON/OFF valve and the flow control valve 9 is ON/OFF controlled by axial sliding of a top end pipe 11 for discharging the liquefied gas. ON/OFF control is conducted by rotating an ON/OFF lever 12 attached to the top end pipe 11 around the top end pipe 11.

Further, as shown in FIG. 2, the grip 2 is incorporated with a piezoelectric ignition element 13 and a slide switch 14 which slides in a forward to backward direction for driving the piezoelectric ignition element 13. The slide switch 14 is adapted to simultaneously drive a shutter 16 for opening and closing an air hole 8a of the gas mixture generator 8.

As shown in FIG. 1 and FIG. 2, the grip 2 is also incorporated with a temperature indicator 17 having a temperature indication LED 18 and a battery 19 for driving the LED respectively in which the temperature indicator 17 is ON/OFF controlled by a switch 20 disposed to the outer surface of the grip 2.

Figure 3:
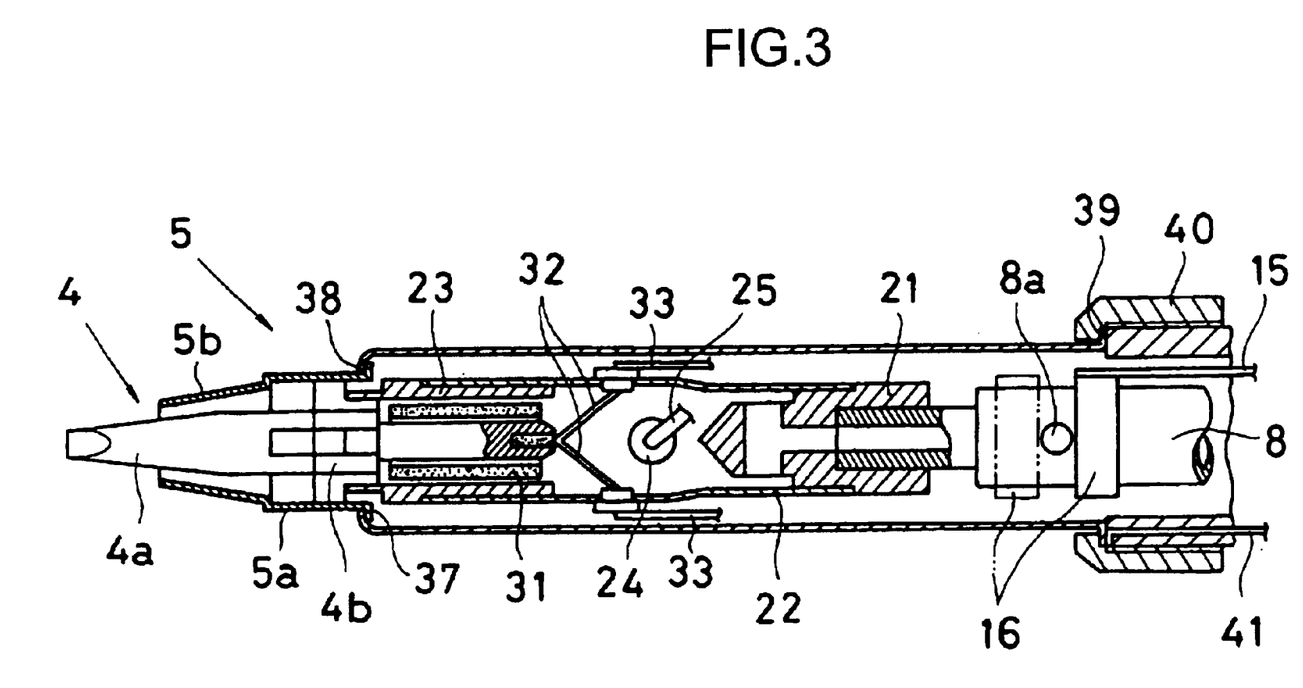
FIG. 3 is an enlarged view for a main part of FIG. 2.

Now as shown in FIG. 3, a nozzle 21 for radially discharging the gas mixture from the gas mixture generator 8 is secured to the top end of the gas mixture generator 8, and the base end of a combustion cylinder 22 is fixed to the outer circumference of the nozzle 21. The soldering iron tip 4 is fixed to the top end of the combustion cylinder 22 by way of a cylindrical connection member 23.

As shown in FIG. 2 and FIG. 3, a piezoelectric ignition plug 24 is disposed ahead of the nozzle 21 in the combustion cylinder 22, and the piezoelectric ignition plug 24 is connected by way of a lead wire 25 to the piezoelectric ignition element 13.

Figure 4:
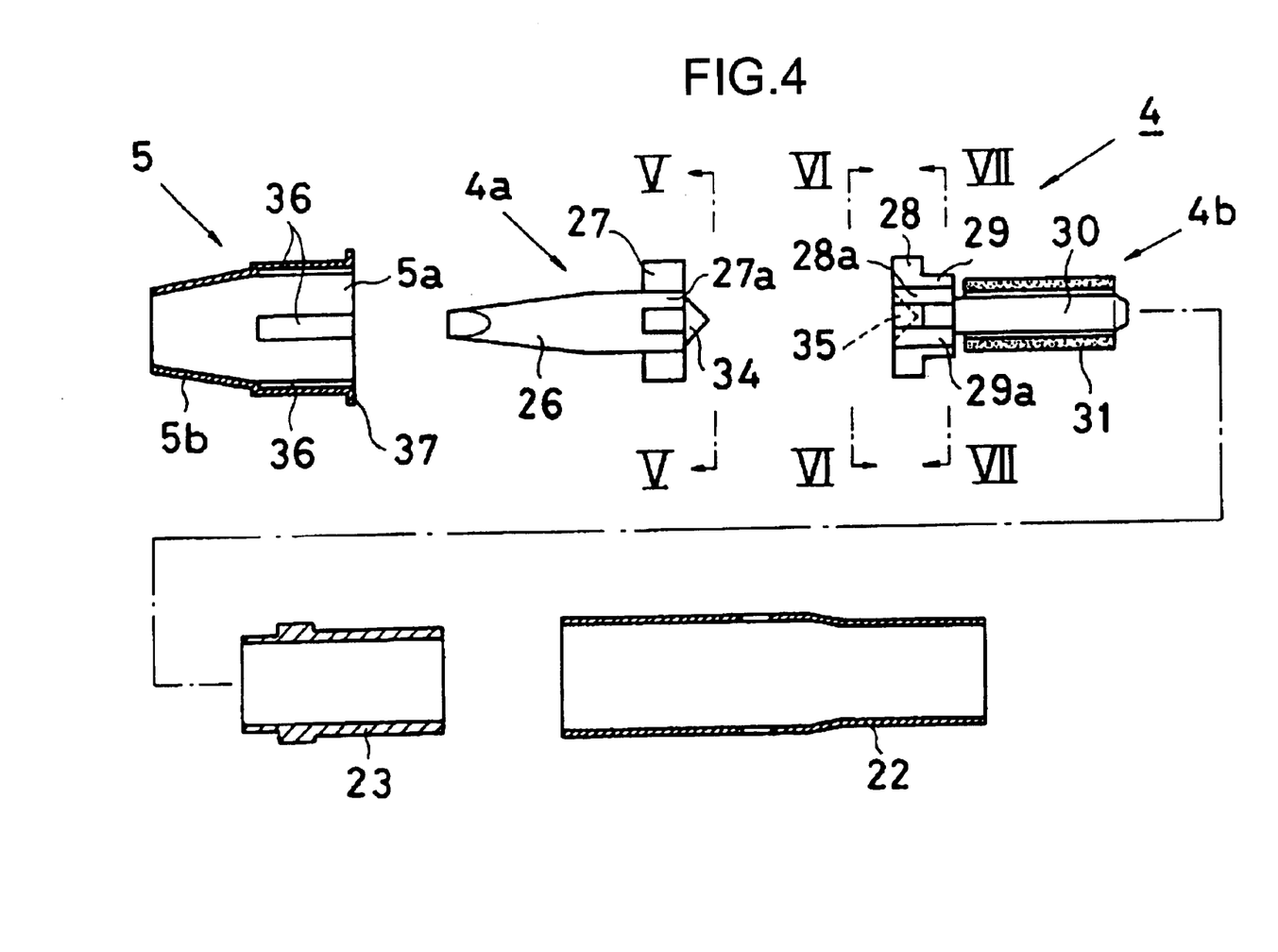
FIG. 4 is an exploded view for a main part of FIG. 4.

As shown in FIG. 4, the soldering iron tip 4 has a two-part structure comprising a top part 4a and a base part 4b in which the top part 4a has a iron tip member 26 and a flange part 27. The base part 4b has a flange part 28, a mounting portion 29 of a small diameter than the flange part 28 and is mounted with the connection member 23, and a rod-like heat collector 30 diametrically smaller than the mounting portion 29. The top part 4a and the base part 4b are in intimate contact with each other in a state where both of the flange parts 27 and 28 are abutted against each other, and a cylindrical combustion catalyst 31 is mounted over the outer circumference of the heat collector 30.

As shown in FIG. 3, a sensor 32 comprising thermocouple is attached to the base end of the heat collector 30, and the sensor 32 is connected by way of a compensation lead wire 33 to the temperature indicator 17 as shown in FIG. 2 and FIG. 3.

Figure 5:
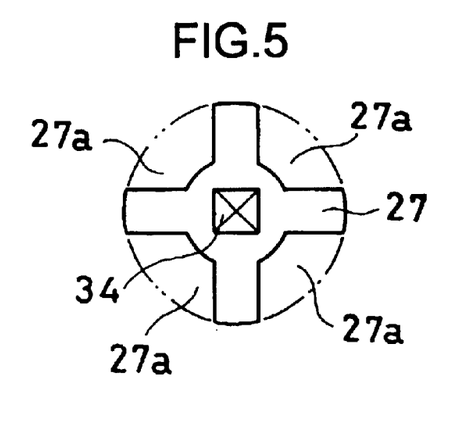
FIG. 5 is an enlarged view along line V—V in FIG. 4.
Figure 6:
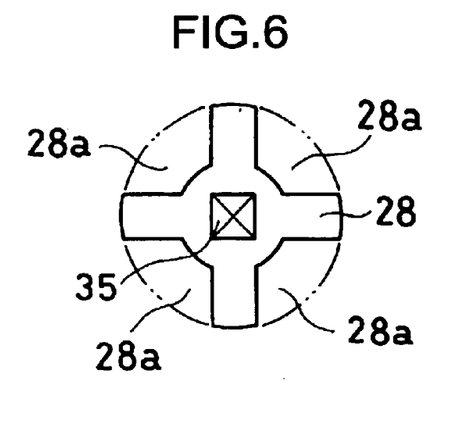
FIG. 6 is an enlarged view along line VI—VI in FIG. 4.

As shown in FIG. 4 to FIG. 6, convex portions 34 each of a pyramidal shape and concave portions 35 each of a corresponding shape are disposed respectively on the abutting end faces of both of the flange parts 27 and 28. Engagement between the convex portion 34 and the concave portion 35 conduct circumferential positioning between the top part 4a and the base part 4b and this also enlarges the area of contact between both of the flange parts 27 and 28.

Figure 7:
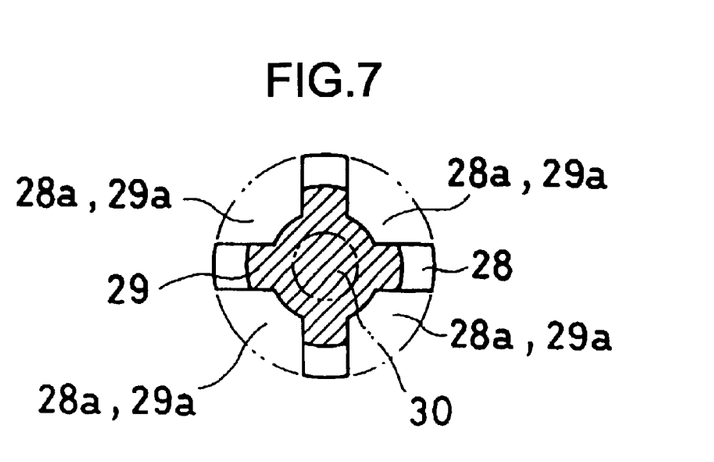
FIG. 7 is an enlarged view along line VII—VII in FIG. 4.

As shown in FIG. 5 to FIG. 7, gas exhaustion portions 27a, 28a and 29a are disposed for each of the outer circumferences of both of the flange parts 27 and 28, and the mounting portion 29 each at a circumferential equal distance, for example, by the number of four. The combustion exhaust gas from the combustion catalyst 31 is exhausted smoothly toward the iron tip member 26 through each of the gas exhaustion portions 27a, 28a, and 29a.

As shown in FIG. 3, a cylindrical gas conduit 5 is mounted to the outer circumference of the soldering iron tip 4 having the constitution described above, and the combustion exhaust gas exhausted from each of the gas exhaustion portions 27a, 28a, and 29a is exhausted along the outer circumference of the iron tip member 26 toward the top end by the gas conduit 5. The combustion exhaustion gas can be utilized as a heat source which preliminarily heats the periphery of the area to be soldered for efficient soldering, as well as the combustion exhaust gas is also utilized for eliminating static charges of an operator or materials to be soldered. This will be described more in details latter.

The gas conduit 5 is formed of a metal material and, as shown in FIG. 3 and FIG. 4, has a main part 5a mounted to both of the flange parts 27 and 28 of the soldering iron tip 4 and a tapered part 5b protruded from the top end of the main part 5a in which four engaging grooves 36 are formed to the circumferential surface of the main part 5a each at an equi-circumferential distance, and cross-like protruded outer edges of both of the flange parts 27 and 28 are engaged into each of the engaging grooves 36 respectively. This conducts circumferential positioning between the top part 4a of the soldering iron tip 4 and the base part 4b.

Further, as shown in FIG. 3 and FIG. 4, a flange 37 is disposed integrally to the base end of the main part 5a. An inner flange 38 at the top end of a support pipe 3 for example, made of stainless steel that covers a portion between the soldering iron tip 4 and the grip 2 engages the flange 37 from the side of the top end. As shown in FIG. 3, a base end flange 39 in contact with the top end face of the grip 2 is disposed to the base end of the support pipe 3, and the base end flange 39 is supported from the outer surface by a fixing nut 40 screw-coupled to the top end of the grip 2 as shown in FIG. 2 and FIG. 3. Thus, the support pipe 3 is fixed to the grip 2.

As shown in FIG. 2, the top end of an electroconductive strap 41 disposed at the base end thereof in the form of a ring to the outer circumference of the grip 2 is in contact with the base end flange 39 of the support pipe 3, by which the operator who holds the grip 2 and the soldering iron tip 4 are electrically connected by way of the electroconductive strap 41, the support pipe 33 and the gas conduit 5 even in a case where the grip 2 is formed of an electrically insulating material. In a case where the grip 2 is formed of a conductive material, the electroconductive strap 41 is not necessary.

The operation of this embodiment is to be described. When the soldering iron is used, an operator controls the opening degree of the flow control valve 9 to an appropriate value by using the control lever 10 and then rotates the open/close lever 12 to the open side. Then, the top end pipe 11 slides toward the top end to open the flow control valve 9.

When the flow control valve 9 is opened, the fuel gas in the gas reservoir 6 is supplied into the gas mixture generator 8, and the ejector effect of the generator sucks external air through the air hole 8a into the gas mixture generator 8. Then, a gas mixture of the fuel gas and air is formed in the gas mixture generator 8. The generated gas mixture is discharged by way of the nozzle 21 into the combustion cylinder 2.

In this state, when the slide switch 14 is caused to slide toward the top end, a shutter 16 which was situated initially at a solid line position passes over the air hole 8a and moves to a chained line position in FIG. 3 in which the piezoelectric ignition element 13 is actuated. When the piezoelectric ignition element 13 is actuated, sparks are generated between the piezoelectric ignition plug 24 and the nozzle 21, and the gas mixture discharged from the nozzle 21 is put to flaming combustion in the combustion cylinder 22. Then, the temperature combustion catalyst 31 is elevated to an oxidizing reaction temperature for 1 to 2 sec by the flaming combustion.

Then, when the force exerted so far on the slide switch 14 is removed, the slide switch 14 which was retained at the forward position is caused to slide back toward the rear end by the resiliency of a spring incorporated in the piezoelectric ignition element 13. Then shutter 16 kept at a position shown by the chained line in FIG. 3 is returned to the solid line position shown in FIG. 3.

When the shutter 16 returns from the dotted line position to the solid line position in FIG. 3, it once entirely closes the air hole 8a of the gas mixture generator 8 in the course of returning stroke. Accordingly, flame in the combustion chamber 22 is extinguished and, the gas mixture is supplied without flaming combustion directly to the combustion catalyst 31 and flameless combustion is started in the combustion catalyst 31.

When the flameless combustion starts by the combustion catalyst 31, the heat collector 30 is at first heated by the heat of combustion and then the connection member 23 is heated and the heat is transferred to the mounting portion 29, both of the flange parts 27 and 28, and the iron tip member 26. Then, the temperature of the entire soldering iron tip 4 is elevated to a substantially constant temperature within an extremely short period of time of about five sec.

A combustion exhaust gas formed by flameless combustion is passed through each of gas exhaustion portions 27a, 28a and 29a of both flange parts 27 and 28 and the mounting portion 29, and then exhausted along the outer circumference of the iron tip member 26 toward the top end while being guided by the tapered portion 5b of the gas conduit 5. In this case, the entire soldering iron tip 4 is heated by the heat exchange with the combustion exhaust gas in a shorter period of time and to a more uniform temperature. Further, since the entire soldering iron tip 4 is surrounded with the inert combustion exhaust gas, the soldering iron tip 4, particularly, the iron tip member 26 can be prevented from oxidation.

Now, when an operator conducts soldering operation while gripping the grip 2 in a state where the combustion exhaust gas is exhausted along the outer circumference of the soldering iron tip portion 26 toward the top end, materials to be soldered such as printed substrates or electronic parts are preliminarily heated by the combustion exhaust gas before soldering. Accordingly, even when the size of the soldering iron tip 4 is decreased so as to cope with reduction of the size of the circuit substrate or electronic parts, decrease in the heat capacity of the soldering iron tip 4 can be compensated by the combustion exhaust gas and this can effectively cope with soldering operation using Pb-free solder.

Further, since the soldering iron 1 according to this embodiment uses a liquefied gas such as a butane gas as a fuel gas, static charges accumulated on an operator or materials to be soldered can be eliminated as detailed below. Particularly, since charge elimination from an operator usually requires a charge elimination device which is expensive and tends to hinder the operation, save of such charge elimination device has an extremely desirable practical effect.

Then, the principle of electric charge elimination in the present invention is to be described.

Fuel gas combustion products are ionized through chemical ionic reactions in the course of combustion reaction, so that they can eliminate electrostatic charges at the periphery thereof. Since the chemical ionizing reaction is not a reaction by way of thermal activating processes, a number of ions are formed near the reaction sites even in a catalytic reaction that takes place combustion at a relatively low temperature. Further, it has been well known that the ions at higher concentration are formed from aliphatic hydrocarbon fuels such as butane and propane.

As described above, a number of ions are formed at the surroundings of the combustion catalyst 31 in this embodiment and the soldering iron tip is disposed in close adjacent with the combustion catalyst 31. Then, since the soldering iron tip 4 and the operator are electrically connected by way of the electroconductive strap 41 and the like, the static charges on the operator are eliminated instantaneously. Further, even when static charges are accumulated again on the operator during operation, since ions are formed continuously so long as flameless combustion is conducted by the combustion catalyst 31, the effect of eliminating static charges from the operator can always be obtained.

Further, the combustion exhaust gas exhausted along the outer circumference of the soldering iron tip 4 toward the top end contains a great amount of steams as the combustion products. Therefore, in the course where they are blown to the materials to be soldered at a room temperature and cooled, steams are condensed as adsorbed films of molecules of water to increase the electroconductivity on the surface of the soldering iron tip 4. As a result, leakage (diffusion) of the static charges on the material to be soldered is promoted to conduct or perform charge elimination.

Further, since the combustion exhaust gas is at high temperature, the effect of eliminating charges from dielectric materials by the steam-containing combustion exhaust gas is enhanced more.

It has generally been known that static charges on dielectric materials such as polymeric materials can not be eliminated by merely rubbing them with wet cloths or immersing them in water but can be eliminate only when they are wiped with alcohol-immersed cloths or immersed in alcohols. As can be seen from the foregoings, for improving the charge eliminating effect, it is an important factor that molecules of water or alcohol are sufficiently adsorbed on the surface of the charged materials to form conductive adsorbed molecular layers thereon.

In a case where the surface of dielectric material on which a number of gas molecules have already been adsorbed is put under an atmosphere containing steams at normal temperature, the probability that the already adsorbed molecules are replaced with molecules of water is small and, accordingly, no remarkable charge elimination effect can be expected. On the contrary, when the dielectric material is placed in an atmosphere of the combustion exhaust gas, the temperature on the surface of the dielectric material is elevated tending to cause desorption of the already adsorbed molecules and since the kinetic energy of molecules of water is increased, the probability of replacement caused by collision of molecules of water against the already adsorbed molecules is increased to form the layer of adsorbed molecules of water more reliably.

Further, since steams at high temperature take a longer time for cooling and condensation and flow and spread for a wide range, they naturally improve the efficiency of forming layers of adsorbed molecules extensively and uniformly on the surface of the substrate mounted with a number of parts and thus having a complicated surface shape.

By using the soldering iron 1 according to this embodiment, static charges accumulated on the operator or the materials to be soldered can be eliminated to prevent damages of electronic parts and the like caused by static charges. Also, the efficiency for the soldering operation can be improved even when the size of the soldering iron tip 4 is decreased, and the soldering iron tip can be prevented from oxidation to enhance the working life. Further, since the soldering operation can be conducted while always confirming the temperature of the iron tip member 26 by the temperature indicator 17, loss of products caused by soldering failure can be decreased.

FIG. 8 to FIG. 11 show a second preferred embodiment of the present invention, in which the support pipe 3 and the gas conduit 5 in the first embodiment are replaced with a guide pipe 43 that serves both as the support pipe 3 and gas conduit 5, and the soldering iron tip 4 in the first preferred embodiment is replaced with a soldering iron tip 44.

Figure 8:
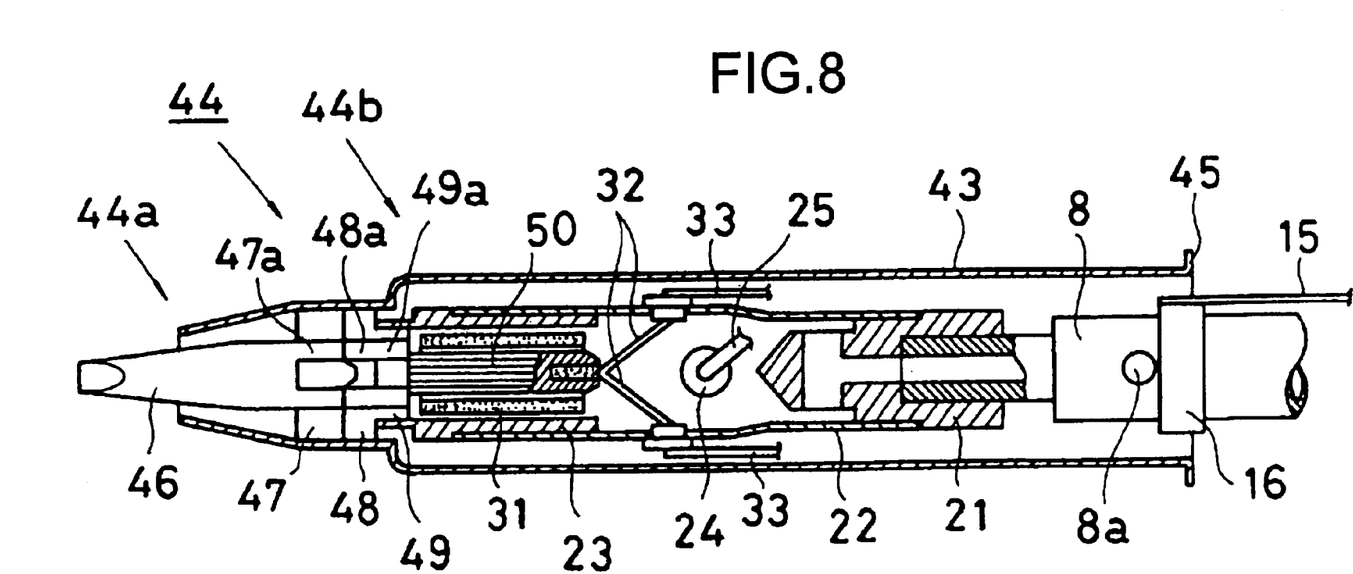
FIG. 8 is a view, corresponding to FIG. 3, illustrating a second embodiment of the invention.

That is, as shown in FIG. 8, the guide pipe 43 has both the functions of the support pipe 3 and the gas conduit 5 in the first embodiment, in which a base end flange 45 is fixed to a grip 2 for soldering iron by way of the fixing nut 40 (refer to FIG. 2 and FIG. 3), and the guide pipe 43 is fixed with a top part 44a of the soldering iron tip 44 to be described later.

As shown in FIG. 8, the soldering iron tip 44 has a two part structure comprising a top part 44a and a base part 44b in which the top part 44a comprises a iron tip member 46 and a flange part 47, while the base part 44b comprises a flange part 48 a mounting portion 49 to which a connection member 23 is mounted and a rod-like heat collector 50 to which the combustion catalyst 31 is mounted.

Figure 9:
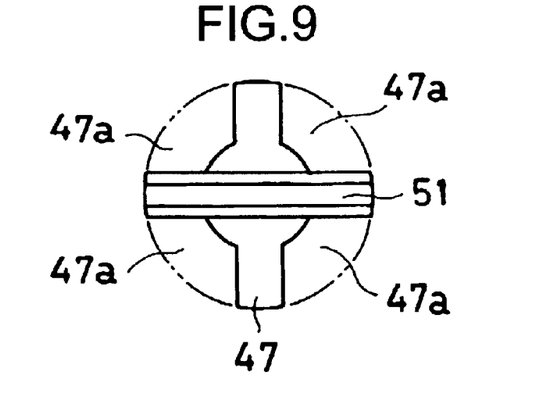
FIG. 9 is a view for a tip portion of FIG. 8 as viewed from the flange.
Figure 10:
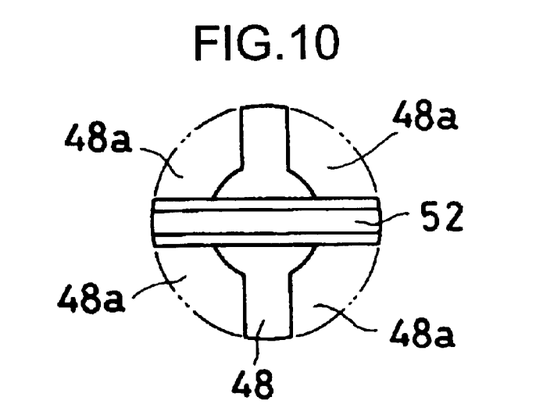
FIG. 10 is a view for a base part of FIG. 8 as viewed from the flange.

As shown in FIG. 8 to FIG. 10, a diametrical convex portion 51 and a diametrical concave portion 52 are formed on abutting end faces of both of the flange parts 47 and 48 respectively, and engagement of the convex portion 51 and the concave portion 52 conducts circumferential positioning between the top part 44a and the base part 44b, and enlarges the area of contact between both of the flange parts 47 and 48.

Figure 11:
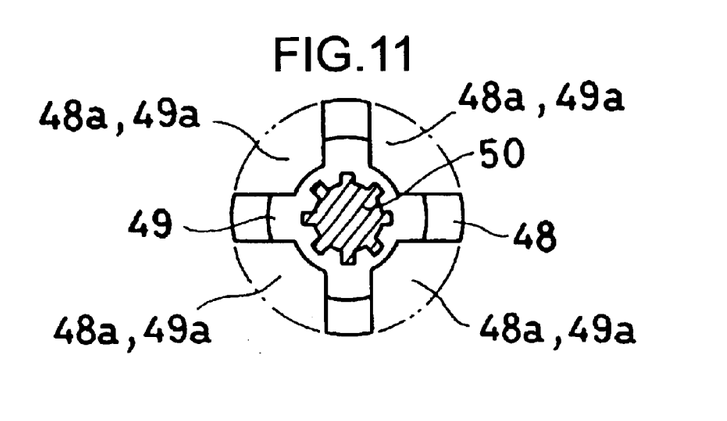
FIG. 11 is a cross sectional view showing the shape for the outer circumference of a heat collector shown in FIG. 8.

As shown in FIG. 9 to FIG. 11, gas exhaustion portions 47a, 48a and 49a are disposed to each of the outer circumferences of both of the flange parts 47 and 48, and the mounting portion 49, each at an equi-circumferential distance and each, for example, by the number of four, respectively, and a combustion exhaust gas from the combustion catalyst 31 is smoothly exhausted toward the soldering iron tip 41 through each of the gas exhaustion portions 47a and 49b.

As shown in FIG. 11, the heat collector 50 has an uneven configuration on the outer circumferential surface thereof different from the heat collector 30 in the first embodiment, by which the heat receiving area of the heat collector 50 can be enlarged.

As shown in FIG. 8, the guide pipe 43 is disposed for the outer circumference of the soldering iron tip 44 having the constitution described above. The guide pipe 43 is integrated with the top part 44a and, when the top part 44b is replaced, the guide pipe 43 is also replaced together.

Other constitutions and the operations are identical with those of the first embodiment.

In this embodiment, since the structure is simplified compared with the first embodiment, the cost can be reduced.

In both of the first and second embodiments described above, the soldering iron tip 4 and 44 have been explained to a case where the soldering iron tip has a two-part structure comprising the top part 4a or 44a and base part 4b or 44b, but it may be a soldering iron tip of a one piece structure. Further, the temperature indicator 17 may be constituted as a separate structure not incorporated into the grip 2 for soldering iron in which temperature may be indicated by connecting a terminal provided to the grip 2 with a temperature indicator 17 of a separate structure. Further, the sensor 32 may optionally be saved. Further, the soldering iron tip 4, 44 and the operator may directly be connected electrically using an electroconductive cord or the like.

EXAMPLE

Figure 12:
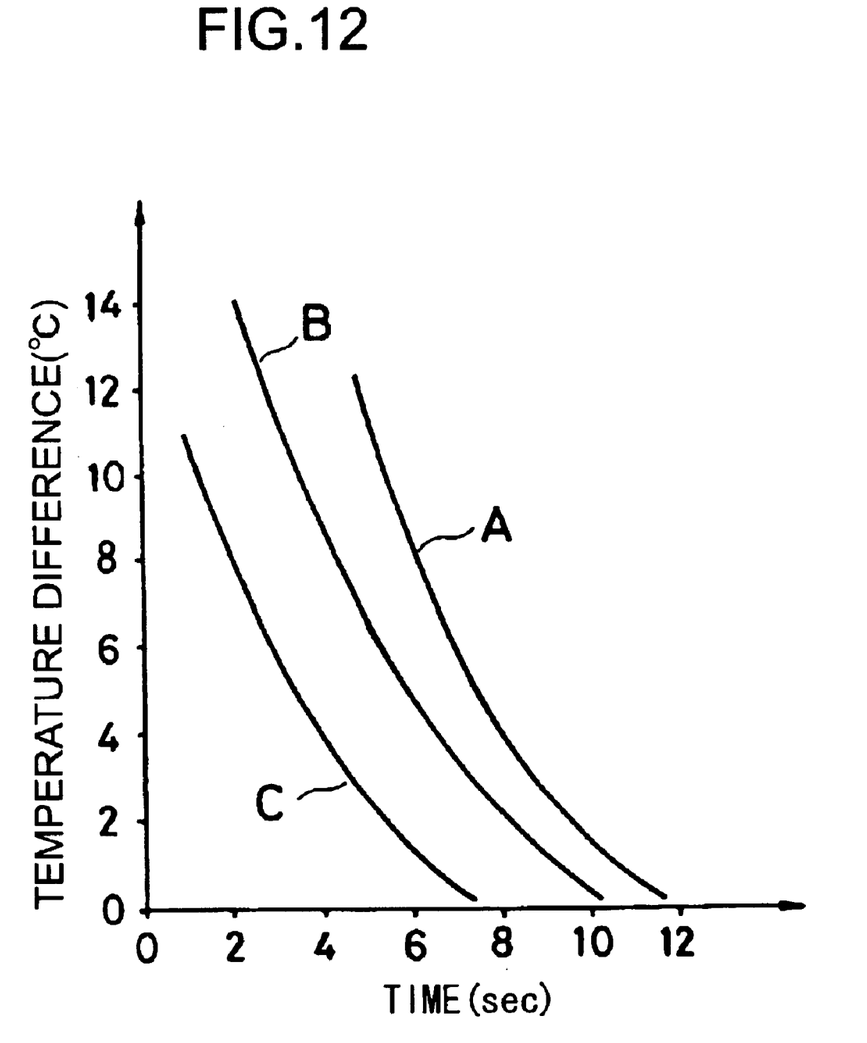
FIG. 12 is a graph showing the result of an experiment conducted by present inventors.

The present inventors have made an experiment for the temperature difference between the iron tip member 26 and the base end of the heat collector 30 by using the soldering iron tip 4 shown in FIG. 3 and obtained a result shown in FIG. 12.

That is, the present inventors have manufactured three types of soldering iron tips 4. The length for the heat collector 30 was 20 mm for each of them and the diameter thereof was 2.0 mm, 2.5 mm and 3.0 mm, respectively. Then, each of the iron tip member 26 of each soldering iron tip 4 was immersed in an oil bath at 100° C. and heated rapidly, and change with lapse of time of temperature for the heat collector 30 was measured. In FIG. 12, a graph A shows a characteristic curve in a case of 2.0 mm diameter, a graph B shows a characteristic curve in a case of 1.5 mm diameter, and a graph C shows a characteristic curve in a case of 3.0 mm diameter.

As apparent from FIG. 12, it can be seen that even when the length of the heat collector 30 was 20 mm, the temperature can be elevated to 93° C. (temperature difference of 7° C.) within 5 sec in a case of 2.5 mm diameter, and to 97° C. (temperature difference 3° C.) within 5 sec in a case of 3.0 mm diameter.

In view of the foregoings, when the temperature of the iron tip member 26 is detected by attaching the sensor 32 to the base end of the heat collector 30, it can be seen that the temperature at the iron tip member 26 can be detected accurately with no practical problems at all when the diameter of the heat collector 30 is 3.0 mm or more.

In accordance with the present invention, since the soldering iron comprises a combustion catalyst for complete combustion of a gas mixture of a fuel gas and air, a soldering iron tip heated by the combustion catalyst, a gas conduit for exhausting a combustion exhaust gas from the combustion catalyst along the outer circumference of the soldering iron tip toward the top end, and an electric conduction mechanism for electrically connecting an operator for conducting soldering and the soldering iron tip, static charges accumulated on the materials to be soldered, as well as static charges accumulated on the operator can be eliminated due to the charge elimination effect obtained from the combustion catalyst and the combustion exhaust gas, by connecting the operator and the soldering iron tip electrically by way of the electroconduction mechanism.

Further, since the periphery for the area to be soldered is heated preliminarily by the combustion exhaust gas, even when the size of the soldering iron tip is decreased, insufficiency of the heat capacity of the tip can be compensated by the heat of the combustion exhaust gas. Further, since the periphery of the soldering iron tip is surrounded with the inert combustion exhaust gas, the soldering iron tip can be prevented from oxidation to enhance the working life.

In the soldering iron of the invention, since the soldering iron tip comprises a flange situated at a longitudinal intermediate position, a iron tip member situated to the top end of the flange and a heat collector situated to the base end of the flange, in which the combustion catalyst is disposed to the heat collector and the flange has gas exhaustion portions for exhausting the combustion exhaust gas toward the iron tip member, the energy of heat generated from the combustion catalyst can be transferred efficiently to the soldering iron tip.

In the embodiment described above, since the soldering iron tip comprises a base part having a base end flange constituting a portion of the flange and the heat collector and a top part having a top end flange constituting the remaining portion of the flange and a iron tip member in which the top part is made exchangeable, the iron tip member can be exchanged easily and inexpensively when the member is exhausted.

In this case, since the gas conduit is disposed to the outer circumference of the flange, and the base part and the top part are circumferentially positioned by the gas conduit, circumferential positioning between the exchangeable top part and the base part can be conducted easily.

Further, since the base part and the top part have concave and convex portions engaging to each other on the contact surfaces thereof and the base part and the top part are circumferentially positioned by the engagement between the concave and convex portions, even in a case where the top part of the soldering iron tip is made into an exchangeable structure, it can be easily positioned circumferentially with the base part and lowering of temperature at the iron tip member can be decreased extremely.

In each of the embodiments described above, since the heat collector has a sensor at the base end thereof for detecting the temperature at the iron tip member, the sensor can be attached easily and the temperature at the iron tip member can be detected accurately.

In this case, since the sensor is connected with the temperature indicator provided to the grip for soldering iron, the temperature at the iron tip member can always be confirmed upon soldering operation to greatly reduce the occurrence of failed products.

In each of the embodiments described above, since the electroconduction mechanism comprises a conductive grip part disposed to the grip for soldering iron and an intermediate conductive portion connecting the conductive grip part with the iron tip member, an operator who conducts soldering operation can eliminate static charges quite unconsciously by merely holding the grip during usual soldering operation for charge elimination, and this does not increase operator's burden at all.

In a modified embodiment, since the conductive grip part is formed of an electroconductive member situated on the surface of the grip for soldering iron, the conductive grip part can be constituted as a separate member from the grip for soldering iron, or can be constituted with the grip per se.

What is claimed is:

1. A soldering iron comprising:

a combustion catalyst for complete combustion of a gas mixture of a fuel gas and air, a soldering iron tip heated by the combustion catalyst, a gas conduit that surrounds an outer circumference of a soldering iron tip, to define a channel for exhausting a combustion exhaust gas from the combustion catalyst along the outer circumference of the soldering iron tip toward the top end, a grip having an electroconductive grip portion to be held by an operator during a soldering operation, and mechanism for electrically connecting the electroconductive grip portion with the soldering iron tip.

2. A soldering iron as defined in claim 1, wherein the soldering iron tip comprises a flange situated at a longitudinal intermediate position, a soldering top member situated to the top end of the flange and a heat collector situated to the base end of the flange, in which the combustion catalyst is disposed to the heat collector and the flange has gas exhaustion portions for exhausting the combustion exhaust gas toward the soldering top member.

3. A soldering iron as defined in claim 2, wherein the soldering iron tip comprises a base part having a base end flange constituting a portion of the flange and the heat collector, and a top part having a top end flange constituting the remaining portion of the flange and a iron tip member in which the top part is made exchangeable.

4. A soldering iron as defined in claim 3, wherein said gas conduit is disposed to the outer circumference of the flange and the base part and the top part are circumferentially positioned by the gas conduit.

5. A soldering iron as defined in claim 3, wherein the base part and the top part have concave and convex portions engaging to each other on the contact surfaces thereof and the base part and the top part are circumferentially positioned by the engagement between the concave and convex portions.

6. A soldering iron as defined in claim 2, wherein the heat collector has a sensor for detecting the temperature at the iron tip.

7. A soldering iron as defined in claim 6, wherein the sensor is connected with a temperature indicator provided to said grip for soldering iron.

8. A soldering iron as defined in claim 1, wherein the mechanism comprises an electroconductive grip portion disposed to the grip for soldering iron and an intermediate conductive portion connecting the conductive grip portion with the iron tip.

9. A soldering iron as defined in claim 8, wherein the conductive grip portion is formed of an electroconductive member situated on the surface of the grip for soldering iron.

* * * * *